J. T. MARSHALL.
VALVE GEAR FOR FLUID PRESSURE ENGINES.
APPLICATION FILED JAN. 14, 1907.
962,374.
Patented June 21, 1910.
3 SHEETS—SHEET 1.
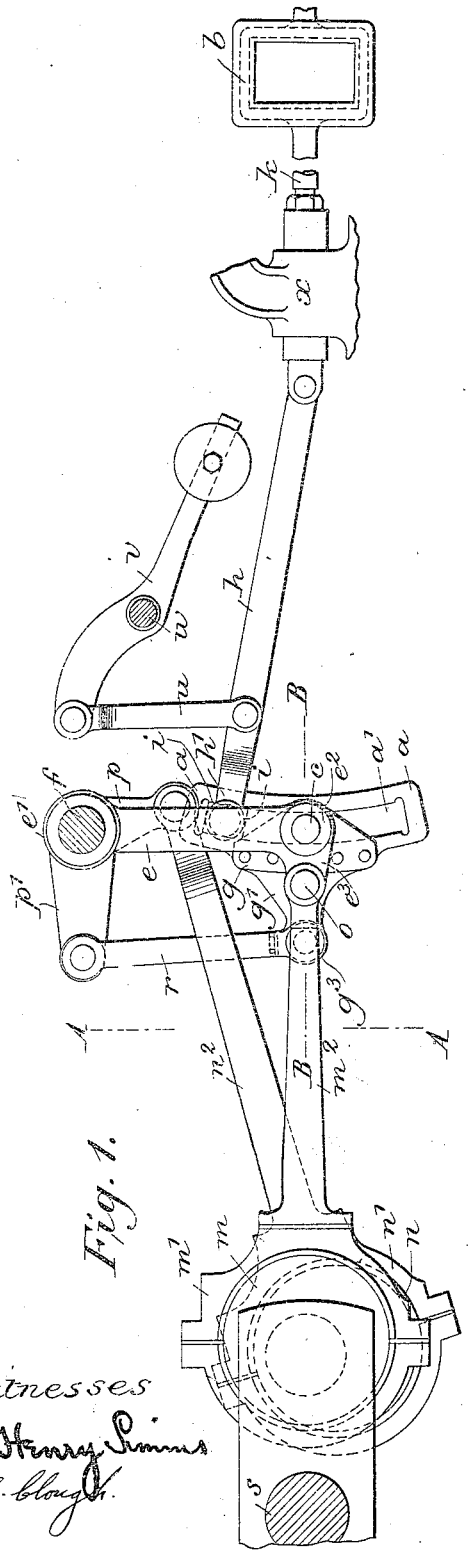
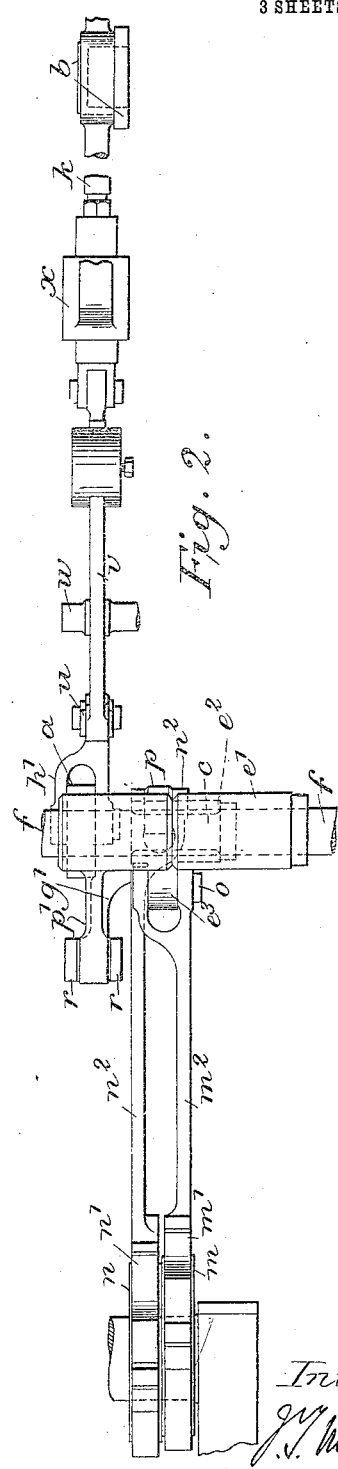
Witnesses
Inventor J. T. MARSHALL.
VALVE GEAR FOR FLUID PRESSURE ENGINES.
APPLICATION FILED JAN. 14, 1907.
962,374.
Patented June 21, 1910.
3 SHEETS—SHEET 2.
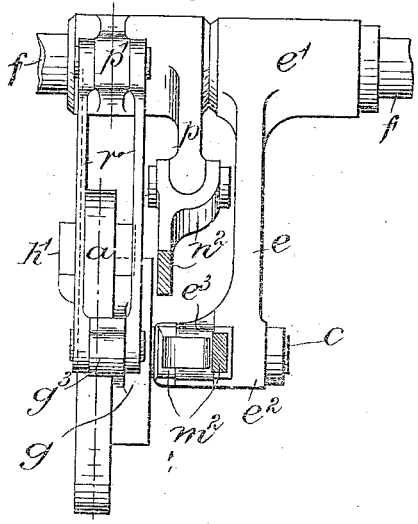
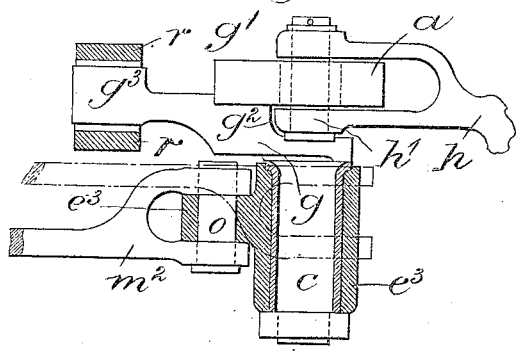
Witnesses
W. Henry Simms
E. Clough.
Inventor
J. T. Marshall
Attorney

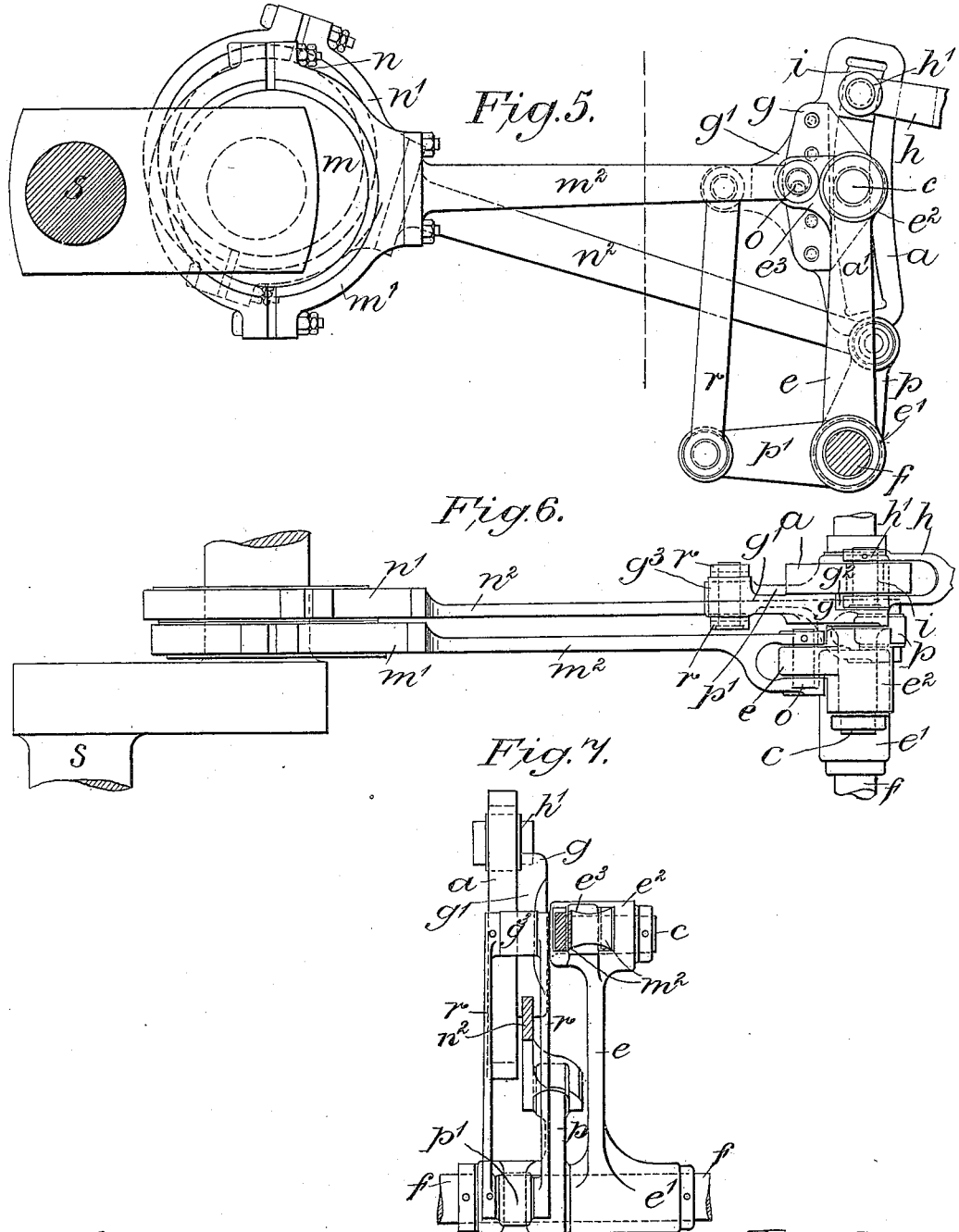

UNITED STATES PATENT OFFICE.

JAMES THOMPSON MARSHALL, OF LEEDS, ENGLAND.

VALVE-GEAR FOR FLUID-PRESSURE ENGINES.

962,374.

Specification of Letters Patent. Patented June 21, 1910.

Application filed January 14, 1907. Serial No. 352,224.

*To all whom it may concern:*

Be it known that I, JAMES THOMPSON MARSHALL, a subject of the King of Great Britain and Ireland, residing at Leeds, in the county of York, England, have invented Improvements in Valve-Gear for Fluid-Pressure Engines, of which the following is a specification.

In the specification of a former British patent granted to me No. 3761 of 1901, there is described valve gear for fluid pressure engines wherein a slotted link or a lever that is connected to and operates the valve of a locomotive or other engine, is oscillated about a pivot by one of two eccentrics through a rocking part and connecting link, and is also moved to and fro by the other eccentric, the angular positions of the two eccentrics in relation to each other and to the crank being such that the valve is suddenly opened and closed by the forward and backward oscillations of the slotted link or lever supplemented by its forward and backward bodily movements, and the valve is caused to dwell or remain stationary between its opening and closing movements by the backward and forward oscillations of the slotted link or lever being respectively neutralized by its forward and backward bodily movements.

In the constructional arrangement of valve gear of the kind referred to described in the former specification, the lead of the valve is not equal in the forward and backward positions of the valve and is not the same whether the engine is running backward or forward.

Now the present invention has for object to obviate this disadvantage by making the lead of the valve equal at both ends of the valve, whether the engine is running backward or forward.

It also has for object to simplify the construction and reduce the dimensions of the valve gear in the transverse direction in the neighborhood of the central portion of the slotted radius link so as to better adapt such gear for application to inside cylinder locomotive engines, and specially to those engines wherein the cylinders are arranged close together, and even to engines of narrow gage, and provide ample room between the slide valve gear and the engine connecting rods without necessitating any alterations in the engine other than substituting the new slide valve gear for the old.

To enable the objects of the present invention to be attained, the slotted radius link carrying the die block for directly actuating the slide valve, is provided with a lateral pin that is supported in one end of a link the other end of which is mounted to turn about a shaft the position of which is suitably determined for each particular case by the aid of a diagram of the eccentric rod motions, the arrangement being such that in the working of the apparatus, the said supporting pin is not constrained to work in a rectilinear line, as in the arrangement of apparatus described in the former specification, but is free to swing upward or downward to a small extent, about the shaft as a center, and thereby compensate for the irregular angular movement of the bell crank lever used for oscillating the slotted link upon the pin. The suspension of the slotted link, in the manner described, also enables the dimensions of the gear in the neighborhood of the central portion of the link to be diminished in the lateral direction.

In order that the nature of the present invention may be fully understood I will now proceed to fully describe the same with the aid of the accompanying illustrative drawings wherein—

Figures 1, 2 and 3 show one construction of valve gear embodying the present invention, Fig. 1 being a side elevation, Fig. 2 a plan, and Fig. 3 a sectional end elevation corresponding to the line A—A of Fig. 1. Fig. 4 is a horizontal section corresponding to the line B—B of Fig. 1, but to a larger scale. Figs. 5, 6 and 7 are views similar to Figs. 1, 2 and 3, respectively showing a modified form of the invention.

According to the present invention, the slotted radius link $a$ used for operating each steam distributing valve $b$ is supported at its central portion from one side only by a pin $c$ that is indirectly connected to and extends laterally from one side of the link and is carried by one end of an arm $e$ the other end of which is mounted to rock about a stationary pin or shaft $f$ which is supported above the said link $a$. The pin $c$ has its axis arranged opposite the center line of the slot $a^1$ in the link $a$ and is arranged to project laterally from a plate or bracket $g$ (hereinafter called a bracket) that is secured to one side only of the link $a$, and is provided with a rearwardly extending arm $g^1$. The bracket $g$ is recessed at its inner side, viz., that next the link $a$, to a sufficient extent, as shown at $g^2$ in Fig. 4, to admit of the slotted end $h^1$ of the connecting rod $h$ that connects the sliding die $i$ of the link $a$ to the valve rod $k$ sliding freely past it, and the rearwardly extending arm $g^1$ of the bracket $g$ is bent sidewise, as shown in Figs. 2 and 4, so that the free end $g^3$ of such arm will extend partly behind the link $a$ and be of much less width than the total width of the bracket and link. The upper end $e^1$ of the rocking arm $e$ that is mounted to rock on the pin $f$, is made of sufficient thickness or axial length to afford sufficient lateral support and a good wearing surface. The lower end $e^2$ of the rocking arm $e$, where it is jointed to the carrying pin $c$, is made of sufficient thickness or axial length (see Figs. 2 and 4) to afford an efficient support to the pin $c$ and link $a$, and is provided with a rearwardly extending lug or extension $e^3$ that is of much less thickness than the corresponding end $e^2$ of the arm.

The radius link $a$ is actuated and controlled by two eccentrics $m$, $n$ as before. One of these eccentrics, viz., $m$, which is designed to impart the to-and-fro movement to the link, is connected by its strap $m^1$ and rod $m^2$ to the rearwardly extending lug or projection $e^3$ on the lower end $e^2$ of the rocking arm $e$, the end of the rod being forked or slotted and embracing the lug or projection $e^3$, to which it is jointed by a pin $o$. The eccentric $n$ is connected by its strap $n^1$ and rod $n^2$ to one arm $p$ of a bell crank lever $p$ $p^1$ that is mounted to rock about the pin $f$ alongside but independently of the rocking arm $e$, and has a rearwardly extending and more or less horizontal arm $p^1$ that is connected by a downwardly extending pair of connecting links $r$, or it may be by a single connecting link, to the rearwardly extending arm $g^1$ of the bracket $g$. The arm $p$ of the bell crank lever $p$ $p^1$ is located in a plane between the rocking arm $e$ and the radius link $a$ and extends downwardly, and so as to occupy a vertical, or nearly vertical position when in the mid position of its travel. The rearwardly extending arm $p^1$ of the bell crank lever $p$ $p^1$ is located above the radius link $a$ and preferably in a plane a little to one side of that containing the center line of the link, as shown in Fig. 3. The rod $m^2$ of the eccentric $m$ extends in a more or less horizontal direction, and the rod $n^2$ of the eccentric $n$ inclines in an upward and forward direction to its point of connection with the arm $p$ of the bell crank lever $p$ $p^1$.

The arrangement of the eccentrics $m$ and $n$ relatively to each other and to the engine crank pin $s$, and the throw of the eccentrics, are the same as in the former arrangement of valve gear hereinbefore referred to, that is to say the eccentric $m$ is arranged about 180° in advance of the corresponding engine crank pin $s$, and the eccentric $n$ is arranged about 90° in advance of the eccentric $m$, the throw of the eccentric $m$ being equal to the lap and lead of the valve $b$, and the throw of the eccentric $n$ being sufficient to move the valve $b$ so as to fully open each inlet port of the engine cylinder in turn at the required times.

Figs. 5, 6 and 7 are similar views to Figs. 1, 2 and 3 respectively, showing an arrangement of the improved valve gear in which the pin or shaft $f$ is located below the link $a$, the rocking arm $e$, the bell crank lever $p$ $p^1$ and other parts being reversed or altered in position, as illustrated. In this case, the eccentric $m$ is placed about 180° in advance of the corresponding engine crank pin $s$, as before, but the eccentric $n$ is placed about 90° in advance of the crank pin.

The position of the pin or shaft $f$ for carrying the rocking arm $e$ and bell crank lever $p$ is determined for each particular case by the aid of a diagram of the eccentric rod motions, the diagram being carefully set out in such a way, and the position of the pin or shaft $f$ so located, that whatever may be the length of the eccentric rods, the angular positions of such rods shall not disturb the position of the radius link $a$ from its true or correct position when the corresponding engine crank pin $s$ is in either the forward or backward position.

In each arrangement the axis of the pin $c$ is constrained to oscillate in a longitudinal direction through an arc of a circle the center of which coincides with the axis of the pin $f$ about which the arm $e$ rocks under the action of the eccentric $m$. In each arrangement the die $i$ in the slotted link $a$ is connected to the valve rod $k$ as before, by the connecting rod $h$ which is capable of being moved up and down on the slotted link, in the ordinary way, as by a connecting link $u$ (Fig. 1) suspended from a counter-weighted lever $v$ fixed to the shaft $w$ and adapted to be operated by means of the engine reversing gear as usual. The end of the valve rod $k$ to which the connecting rod $h$ is jointed, is mounted so as to slide to and fro in a fixed bearing $x$.

By constructing the valve gear in the improved manner hereinbefore described, the total thickness of the combined parts, viz. the radius link $a$, rocking arm $e$, the bell crank lever $p$ $p^1$, the connecting link or links $r$ and the forked ends of the eccentric rods $m^2$ and $n^2$ connected to the rocking arm $e$ and lever $p$, $p^1$ respectively, can be made so small that the valve gear for two adjacent engine cylinders can be readily supported from a pin or shaft $f$ common to them. Also, the construction of the valve gear is simplified and cheapened as compared with earlier constructions of such valve gear.

Although the invention can be applied equally readily either according to Figs. 1, 2 and 3, or to Figs. 5, 6 and 7, the former arrangement is preferable, where convenient, as the joints between the rocking arm $e$ and bell crank lever $p$ $p^1$ and the pivot pin or shaft $f$ can be better lubricated and kept clean than when the joints are arranged below the link.

What I claim is:—

1. In valve gear of the kind wherein a radius link connected to a slide valve is bodily moved to and fro by the action of an eccentric and oscillated by the action of a second eccentric through a bell crank lever which occupies a different intermediate position when the center of the first eccentric is in its extreme forward position to that occupied when the said center is in its extreme backward position, the combination with said radius link, eccentrics and bell crank lever, of a stationary shaft for said lever, and an arm journaled to said shaft, journaled to said link at the central portion of its length and to the eccentric rod of the first eccentric, said shaft and point of attachment between said radius link and arm being arranged so that an upward and downward movement will be imparted to the radius link to compensate for said irregular motion of the bell crank lever and produce equal lead of the valve at the ends of the forward and backward strokes whether running forward or backward.

2. In valve gear of the kind herein referred to, the combination with a radius link having an adjustable die connected to a slide valve and a rearwardly extending lever arm, an eccentric for moving said link bodily to and fro, and an eccentric for oscillating said link, of a stationary shaft, an arm jointed to said shaft and also to said radius link at the central portion of its length and connected to the rod of the first mentioned eccentric and a bell crank lever journaled on said shaft and having one arm connected to the rod of the second eccentric and its other arm connected to the lever arm on said radius link.

3. In valve gear of the kind herein referred to, the combination with a radius link having an adjustable die connected to a slide valve and a rearwardly extending lever arm, an eccentric for moving said link bodily to and fro, and an eccentric for oscillating said link, of a stationary shaft, an arm journaled at one end to said shaft and at the other end to the central portion of said radius link and to the rod of the second eccentric, and a bell crank lever journaled on said shaft and having one arm connected on the rod of the second eccentric and its other arm connected to the lever arm on said radius link, said shaft and point of attachment between said radius link and arm being arranged so that an upward and downward movement will be imparted to the radius link to compensate for irregular motion of the bell crank lever and arm to rise and fall during the backward and forward motions respectively of the radius link and render the valve gear self-correcting as regards the lead of the slide valve.

4. In valve gear of the kind herein referred to, the combination of a radius link having a rearwardly extending arm and a lateral pin at the central portion of its length, a die adjustable on said link, a slide valve connected to said die, an eccentric for moving said link bodily to and fro, an eccentric for oscillating said link about a horizontal axis, a stationary shaft, an arm journaled at one end to said shaft, and at the other end to the lateral pin on said radius link and also to the rod of the first mentioned eccentric, a bell crank lever journaled on said shaft and having one arm connected to the rod of the second eccentric, and means connecting the other arm of said bell crank lever to the lever arm on said radius link, the center of the shaft being so arranged with reference to the other elements that irregularity of movement of said bell crank lever, due to angularity of the eccentric rods will be corrected, and the lead will be equal at the ends of the forward and backward strokes of the valve both for forward and backward running.

5. In valve gear of the kind herein referred to, the combination of a radius link, a bracket fixed to one side thereof and provided with a lateral pin and with a rearwardly extending lever arm, a die adjustable on said link, a slide valve connected to said die, a stationary shaft, an arm journaled at one end to said shaft and at the other end to said lateral pin and having at the same end a narrow rearward extension, a bell crank lever journaled on said shaft, an eccentric having its rod connected to the rearward extension of said arm, a second eccentric having its rod connected to one arm of said bell crank lever, and means connecting the second arm of said bell crank lever to the lever arm on said bracket, the center of the shaft being so arranged with reference to the other elements that irregularity of movement of said bell crank lever, due to angularity of the eccentric rods will be corrected, and the lead will be equal at the ends of the forward and backward strokes of the valve both for forward and backward running.

6. In valve gear of the kind herein referred to, the combination of a radius link, a bracket fixed to one side thereof and provided with a lateral pin and with a rearwardly extending lever arm, a die adjustable on said link, a slide valve connected to said die, a stationary shaft, an arm journaled at one end to said shaft and at the other end to said lateral pin and having at the same end a narrow rearward extension, a bell crank lever journaled on said shaft and having one arm arranged to extend toward said radius link in a plane between said link and arm, and its other arm extending in a substantially horizontal direction, an eccentric having its rod connected to the rearward extension of said arm, a second eccentric having its rod connected to the first mentioned arm of said bell crank lever, and a link connecting the second arm of the bell crank lever to the lever arm on said bracket, the center of the shaft being so arranged with reference to the other elements that irregularity of movement of said bell crank lever, due to angularity of the eccentric rods will be corrected, and cause the lead to be equal at the ends of the forward and backward strokes of the valve both for forward and backward running.

7. In valve gear of the kind herein referred to, the combination of a radius link having a rearwardly extending arm and a lateral pin at the central portion of its length, a die adjustable on said link, a slide valve connected to said die, an eccentric for moving said link bodily to and fro, an eccentric for oscillating said link about a horizontal axis, a stationary shaft arranged above said link, an arm journaled at one end to said shaft and at the other end to the lateral pin on said radius link and also to the rod of the first mentioned eccentric, a bell crank lever journaled on said shaft and having one arm connected to the rod of the second eccentric, and means connecting the other arm of said bell crank lever to the lever arm on said radius link, the center of the shaft being so arranged with reference to the other elements that irregularity of movement of said bell crank lever, due to angularity of the eccentric rods, will be corrected and the lead will be equal at the ends of the forward and backward strokes of the valve both for forward and backward running.

8. In valve gear of the kind herein referred to, the combination of a radius link, a bracket fixed to one side thereof and provided with a lateral pin and with a rearwardly extending lever arm, a die adjustable on said link, a slide valve connected to said die, a stationary shaft arranged above said radius link, a suspension arm journaled at its upper end on said shaft and at its lower end to said lateral pin and having at such lower end a narrow rearward extension, a bell crank lever journaled on said shaft and having one arm extending downward in a plane between said link and arm and its other arm extending in a substantially horizontal direction, an eccentric having its rod connected to the rearward extension of the arm, a second eccentric having its rod connected to the downwardly extending arm of the bell crank lever, and a link connecting the other arm of the bell crank lever to the rearward extension of said bracket, the center of the shaft being so arranged with reference to the other elements that irregularity of movement of said bell crank lever, due to angularity of the eccentric rods will be corrected, and the lead will be equal at the ends of the forward and backward strokes of the valve both for forward and backward running.

Signed at Boyne Engine Works, Leeds, England this 4th day of January 1907.

JAMES THOMPSON MARSHALL.

Witnesses:
BEN STUART THEAKER,
GEORGE HENDERSON HANBY.